(12) United States Patent  
Jun et al.

(10) Patent No.: US 9,360,693 B2
(45) Date of Patent: Jun. 7, 2016

(54) LCD PANEL WITH NEW CONTROL LINE TOPOLOGY

(71) Applicant: TEXAS INSTRUMENTS INCORPORATED, Dallas, TX (US)

(72) Inventors: Zhang Jun, Shanghai (CN); Ji Ru Jun, Shanghai (CN)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 194 days.

(21) Appl. No.: 14/018,612

(22) Filed: Sep. 5, 2013

(65) Prior Publication Data

US 2014/0063388 A1    Mar. 6, 2014

Related U.S. Application Data

(60) Provisional application No. 61/696,951, filed on Sep. 5, 2012.

(51) Int. Cl.
*G09G 3/04* (2006.01)
*G02F 1/133* (2006.01)
*G02F 1/1333* (2006.01)
*G02F 1/1343* (2006.01)

(52) U.S. Cl.
CPC .......... *G02F 1/13306* (2013.01); *G02F 1/1333* (2013.01); *G02F 1/134327* (2013.01); *G09G 3/04* (2013.01)

(58) Field of Classification Search
USPC .......................................... 345/33–34, 38–39
See application file for complete search history.

(56) References Cited

U.S. PATENT DOCUMENTS 5,977,961 A * 11/1999 Rindal ........................... 345/208
2011/0169814 A1 * 7/2011 Van Ess et al. ................ 345/212

* cited by examiner

*Primary Examiner* — Robin Mishler
(74) *Attorney, Agent, or Firm* — John R. Pessetto; Frank D. Cimino

(57) ABSTRACT

A liquid crystal display (LCD) that includes a plurality of segments, and a plurality of control lines to activate the plurality of segments. Each of the plurality of segments is associated with an intersection of two of the control lines, and each of the plurality of control lines intersects with each of the other plurality of control lines.

5 Claims, 5 Drawing Sheets

LCD PANEL WITH NEW CONTROL LINE TOPOLOGY

CROSS-REFERENCE TO RELATED APPLICATION

The present application claims priority to U.S. Provisional Patent Application No. 61/696,951, filed on Sep. 5, 2012; which is hereby incorporated herein by reference.

BACKGROUND

The conventional liquid crystal display (LCD) is configured into separate regions with each region containing a number of individually activated segments that can display various alpha-numeric characters. One region may conventionally have 7 segments configured in a figure eight pattern. Different combinations of the segments may be used to display a desired number, for example all 7 segments may be used to display an 8. To activate a segment of a conventional LCD panel, two control lines (a common line and a segment line) may be powered to select the desired segment. The control lines of an LCD may be configured into a matrix with the common lines crossing the segment lines—no common lines cross common lines and no segment lines cross segment lines in this control matrix. Thus, for an LCD display with 32 segments, there could be four common lines and 8 segment lines. By powering the correct combination of segment and common lines, a LCD panel may display desired information. To control a larger number of segments additional control lines and additional drivers may be required. However, the current push is for LCD panels with more segments being driven from fewer inputs.

SUMMARY

The problems noted above are solved in large part by a LCD panel that includes a plurality of segments, and a plurality of control lines to activate the plurality of segments. Each of the plurality of segments is associated with an intersection of two of the control lines, and each of the plurality of control lines intersects with each of the other plurality of control lines.

Another solution may be a LCD system that includes a LCD panel having a plurality of control lines coupled to a plurality of input pins, wherein each control line intersects with each of the other control lines and a segment is formed at each intersection. A segment being an area of liquid crystal controlled by voltages applied to the control lines, and a LCD waveform generator coupled to the input pins of the LCD panel and configured to generate and transmit waveforms to the plurality of control lines to activate the segments of the LCD panel. A number of output pins of the LCD waveform generator is equal to the number of input pins of the LCD panel.

BRIEF DESCRIPTION OF THE DRAWINGS

For a detailed description of exemplary embodiments of the invention, reference will now be made to the accompanying drawings in which.

NOTATION AND NOMENCLATURE

Certain terms are used throughout the following description and claims to refer to particular system components. As one skilled in the art will appreciate, companies may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . ." Also, the term "couple" or "couples" is intended to mean either an indirect or direct electrical connection. Thus, if a first device couples to a second device, that connection may be through a direct electrical connection, or through an indirect electrical connection via other devices and connections.

DETAILED DESCRIPTION

The following discussion is directed to various embodiments of the invention. Although one or more of these embodiments may be preferred, the embodiments disclosed should not be interpreted, or otherwise used, as limiting the scope of the disclosure, including the claims. In addition, one skilled in the art will understand that the following description has broad application, and the discussion of any embodiment is meant only to be exemplary of that embodiment, and not intended to intimate that the scope of the disclosure, including the claims, is limited to that embodiment.

LCD technology uses liquid crystal materials to display images and characters, such as letters and numbers. The liquid crystal may be activated by applying an electric field. As used herein, the term "activated" may imply the liquid crystal is switched from being translucent to being reflective by affecting the polarization orientation of the crystals. In the activated state the liquid crystal may appear "lit," and the liquid crystal may appear "unlit" in the inactive state. By positioning the liquid crystal into predefined segments with electrodes on two sides, an electric field may be applied across the segments to activate them. Multiple segments may be used to convey information, e.g., a series of numbers. LCD technology may be implemented in simple LCD display panels for the display of numbers. LCD technology may also be used in high end LCD-based high definition televisions.

Figure 1:
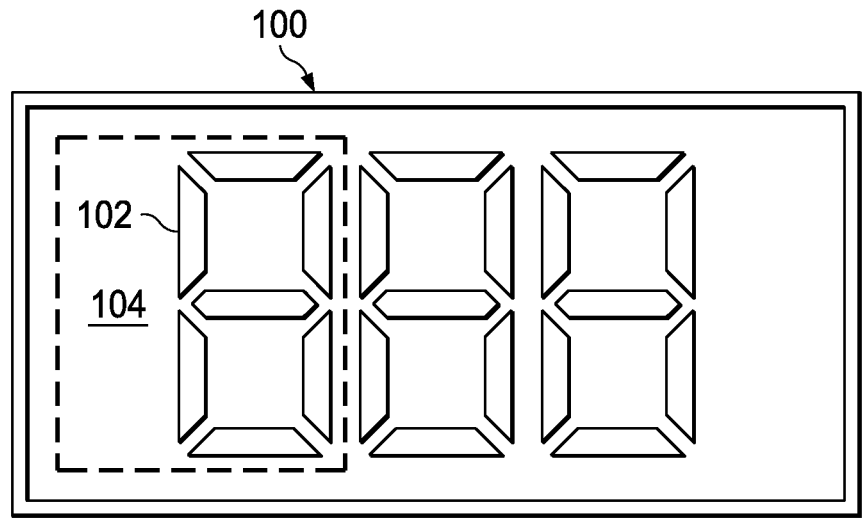
FIG. 1 is an example of a LCD panel 100.

FIG. 1 is an example of a LCD panel 100. The LCD 100, or panel 100, may include multiple regions 104, each region containing multiple segments 102. The panel 100 illustrates seven segments 102 per region 104, but alternative numbers of segments 102 per region 104 is also within the scope of this disclosure. The segments 102 may be activated in various configurations to display desired information (e.g., numbers, letters, etc.). For example, all seven segments 102 of a region may be activated to display an eight. The numbers of zero through nine may also be displayed by one of the regions of the panel 100.

Each of the segments 102 may be activated by applying a voltage to two associated control lines (not shown) that may cross at each segment 102. By varying the voltage difference between the two control lines, the magnitude of the electric field set up by the potential difference may be increased above a threshold to activate the corresponding segment 102. The stronger the electric field, the more reflective the liquid crystals may become. The electric field threshold establishes a boundary for the segment being considered activated to a user's eye. The application of the voltage to activate a segment, however, may require the DC voltage remain at zero so no damage occurs to the liquid crystal material. Thus, when a segment 102 is activated, the two electrodes may need to be adjusted equally but in opposite polarity so that the DC voltage remains at zero. For example, if the threshold of the segment is 3V, then one control line may be driven to +1.5V and the other control line may be pulled down to −1.5V to produce the activation voltage of 3V difference between the two control lines.

Each segment 102 may need to receive an activation voltage in specific patterns to display the desired information to operate the various segments 102 of the panel 100. To display the desired information, a LCD waveform generator may be coupled to the various input pins of the LCD panel. The waveform generator may use a static waveform that varies the voltages on the various control lines between 0V, +V and −V, where 2V would be a voltage great enough to activate a segment. Alternatively, the waveform generator may use multiple levels of electric potential where the potential on each input pin is always varying but the DC voltage on each segment is maintained at 0V to avoid damage. Using the static or the bias waveforms, a duty cycle may also be employed based on the number common control lines. The duty cycle allows the successive activation/deactivation of various segments 102 at a frequency that may not be noticeable to the human eye. This allows for the segments to be cycled on and off from between 50 Hz and 150 Hz, but to the human eye all the segments being cycled appear to be continuously illuminated.

Figure 2:
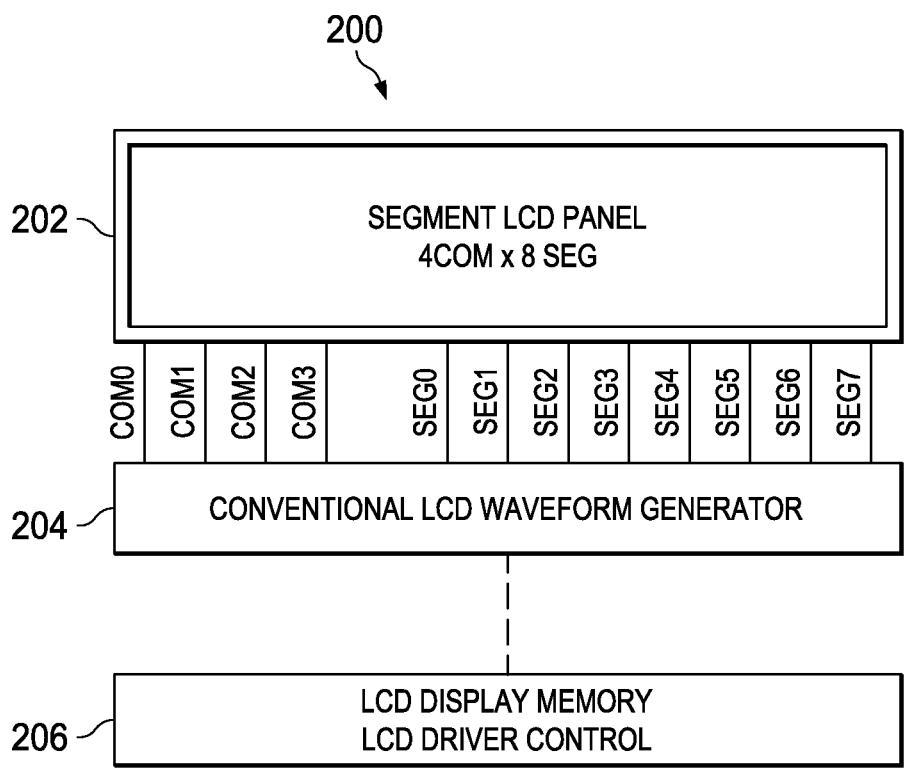
FIG. 2 is an illustrative LCD system 200.

FIG. 2 is an illustrative LCD system 200. The LCD system 200 may comprise a segment LCD panel 202, a conventional waveform generator 204, and a LCD Memory/LCD Driver Control unit 206. The panel 202 may be coupled to the waveform generator 204, which may be coupled to the unit 206. The unit 206 may be a preprocessing unit that first receives the data to be displayed by the panel 202. The unit 206 then may analyze the data and generate the sequence to drive the various segments of the panel 202. The unit 206 may then transmit this sequence information to the waveform generator 204. The waveform generator 204 may use the sequence information to know which control lines (COM1-3 and SEG1-7) to drive, in what sequence and with what waveform to display the desired information.

Figure 3:
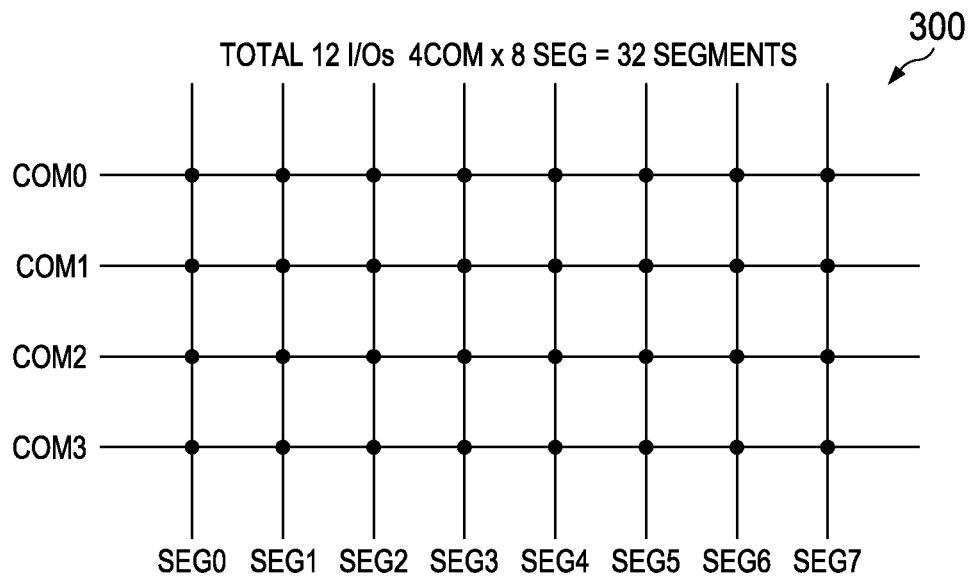
FIG. 3 is an illustrative control line topology 300 for a conventional LCD panel.

The panel 202 may include 12 control lines—four common lines (COM0, COM1 . . . COM3) and 8 segment lines (SEG0, SEG1 . . . SEG7). The 12 control lines may be laid out such that the common lines may contact a number of segments of the panel 202 at one of the segment lines but the common lines never electrically intersect with any of the other common lines. Similarly, the segment lines form segments at intersections with the common lines, but the segment lines never intersect with other segment lines. An illustrative example is shown in FIG. 3, to be discussed below. Due to the use of two different control line types, COM and SEG, and the topology of the control lines, a limited number of segments may be addressed/controlled by a 12 pin conventional LCD panel, such as panel 202.

The number of control lines (SEG and COM) may also be referred to as input/output (I/O) pins of both the panel 202 and the waveform generator 204. There may be additional pins for both the panel 202 and the waveform generator 204 for various other information, e.g., clock cycles, power, ground, etc., but the number of I/O pins and the number of control lines/I/O lines may be used interchangeable herein when discussing the number of segments per I/O lines/pins.

The number of controllable segments for a conventional LCD panel having 12 I/O lines may be 32. In general, a conventional LCD panel may have a maximum number of addressable segments as a function of the number of COM lines and the total number of I/O lines. For example, a 4 COM, 16 I/O pin LCD panel may have a maximum of 48 addressable segments. An 8 COM, 16 I/O pin LCD panel may have a maximum of 64 addressable segments. In general, the number of controllable segments may be defined by the formula $Y*(X-Y)$, where Y is the number of COM lines, X is the total number of I/O lines (Y is included in X).

The unit 206 and the waveform generator 204 may be part of a microcontroller modular unit (MCU), which may be a single integrated circuit (IC), and the panel 202 may be a separate component on another area of a printed circuit board (PCB) holding both the MCU and the panel. The layout of the trace lines coupling the waveform generator 204 and the panel 202 may not have much flexibility in their layout due to the number of I/O pins needed for the control lines and the potential cross-talk between the COM and SEG lines. In addition, having two different types of control lines sets the pin mapping on the waveform generator because the SEG and COM lines may not be interchangeable.

FIG. 3 is an illustrative control line topology 300 for a conventional LCD panel. The topology 300 includes 4 COM lines (COM0, COM1 . . . COM3) and 8 segment lines (SEG0, SEG1 . . . SEG7). The topology 300 is illustrated as a grid, but an actual layout of the COM and SEG lines of an LCD panel may be different. The topology 300, however, illustrates that none of the COM lines intersect with another COM line. Likewise for the SEG lines. The filled circle at each intersection of a COM and SEG line may be the actual liquid crystal segment, such as segment 102. The segments of an LCD display are similar to a capacitor in that the two control lines' intersection is at two electrodes separated by the liquid crystal material. The COM lines may be on the bottom or back of the segment and the SEG lines may be on top or in front of the segment. As such, when a voltage is applied to say COM0 and SEG0, the segment at the COM0-SEG0 intersection may be activated. The activation, however, may depend on whether the voltage difference, i.e., COM0 minus SEG0, creates an electric field that is greater than a threshold.

By applying different waveform patters to the SEG and COM control lines, the LCD panel created by the topology 300 may display information to a user. By continuously and sequentially applying waveforms to the COM and SEG lines, information may be displayed and changed on a LCD panel, such as panel 202. However, the amount of controllable segments, as noted, may be limited by the number of I/O lines of the waveform generator and the LCD panel. The direction of electronics, however, is pushing for smaller and cheaper devices with much greater operability and display capability. To that end, an LCD panel and a waveform generator capable of controlling more segments per the number of I/O pins is desired. Additionally, the trace layouts on the PCB may have flexibility if the I/O pins of a new waveform generator may be remapped.

Disclosed herein are devices and systems for implementing a new LCD panel topology that increases the number of addressable segments per I/O pin. The topology may allow for double or more controllable segments for a similar number of I/O lines over a conventional LCD panel. The new topology may also implement new driver waveforms. The new topology may only use a single type of control line with each control line intersecting each of the other control lines. A controllable segment may be located at each intersection.

Figure 4:
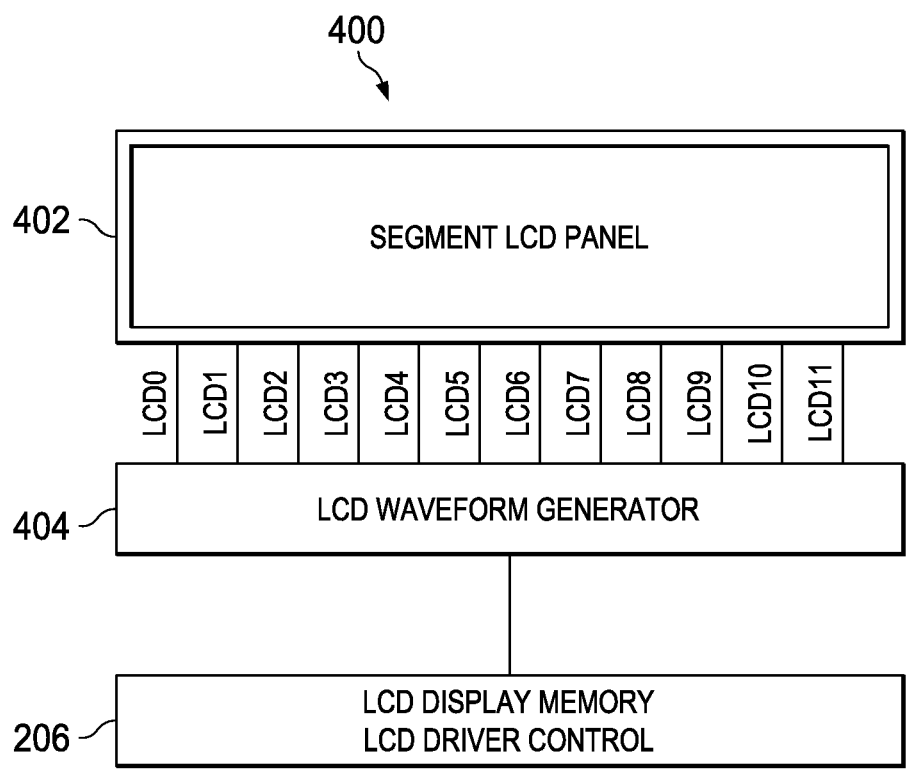
FIG. 4 shows an LCD panel system 400 implementing a new LCD panel and LCD waveform generator in accordance with the principles discussed herein.

FIG. 4 shows an LCD panel system 400 implementing a new LCD panel and LCD waveform generator in accordance with the principles discussed herein. The system 400 may include a LCD panel 402, a LCD waveform generator 404 and a LCD display memory/LCD driver control unit 206. The panel 402 may be coupled to the waveform generator 404 via 12 segment lines. The segment lines of the system 400 may also be referred to as LCD lines, e.g., LCD0, LCD1 . . . LCD11. The segment LCD panel 402 may only use a single type of control line to activate the segments of the panel. The panel 402 is shown with 12 I/O lines, but other numbers of I/O lines are within the scope of the current disclosure. As will be shown, the number of addressable segments may be determined by the number of control lines of the panel. The number of segments of the LCD panel 402 may be greater than, and potentially more than double than, the panel 202 of FIG. 2.

The large number of controllable segments the panel 402 includes may be a function of the layout of the control lines LCD0-11 within the panel 402. The layout or topology of the control lines for the panel 402 (to be discussed in detail in FIG. 5) may need driver waveforms different than the conventional waveforms generated by the waveform generator 204. The waveform generator 404 may need to be adjusted to take into account the topology of the control lines and to ensure the desired segments are activated in the appropriate sequence to display desired information. In addition for adjusting the waveforms generated and transmitted, the waveform generator 404 may allow for the I/O lines to be remapped due to having a single type of control line. Remapping the control lines may allow for more flexible PCB layout. For example, LCD0 and LCD11 may be switched.

Figure 5:
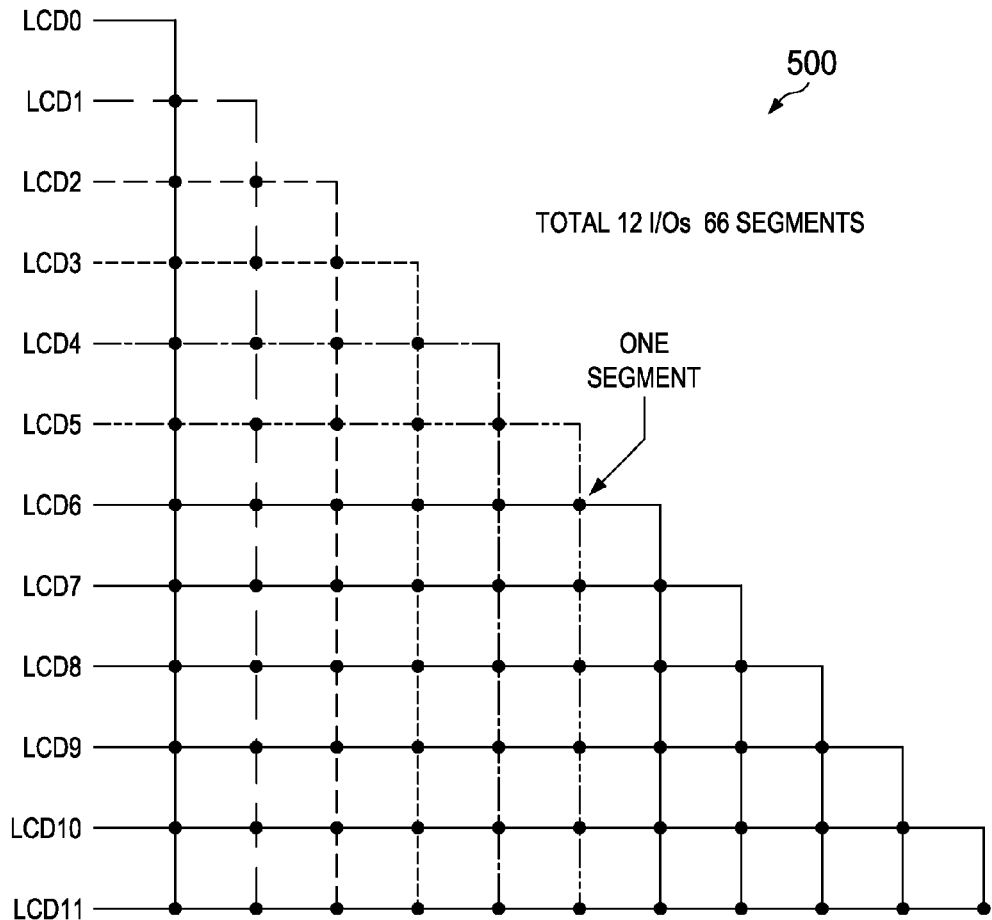
FIG. 5 shows an example topology 500 for the new LCD panel 402 in accordance with various embodiments discussed herein.

FIG. 5 shows an example topology 500 for the new LCD panel 402 in accordance with various embodiments discussed herein. The topology 500 may comprise 12 control lines labeled LCD0, LCD1 through LCD11. The 12 control lines may all electrically intersect with each other to form the segments of an LCD panel 402. The segments may be located at the intersection of the control lines. For example, LCD0 intersects with LCD1 through LCD10 before ending at LCD11. LCD1 first intersects with LCD0 before intersecting with LCD2 through LCD10, ending on LCD11. This pattern may continue through LCD11.

The maximum number of addressable segments in this topology may be defined as the summation from 1 to (X−1) where X is the number of control lines. For the panel 402, with its 12 I/O lines, the maximum number of addressable segments may be 66. Similar for the topology 500 with its 12 control lines. For a comparison, a conventional LCD panel using a topology similar to the topology 300, the maximum number of segments would be 32. The topology 500 more than doubles the number of addressable segments over the conventional topology 300. The increase in the number of segments per control line may deliver added flexibility in design and an increase in the amount of information delivered per waveform generator 404/LCD panel 402 combination. Additionally, implementing an old design with a new LCD panel would likely decrease the number of parts needed. The reduction in parts may directly reduce the overall bill of materials for fabrication of electronic devices.

Figure 6A:
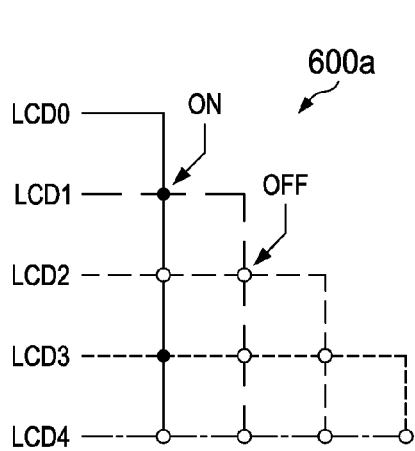
FIG. 6a shows alternate topology 600a for implementing a 5 control line LCD panel in accordance with the principles as discussed herein.
Figure 6B:
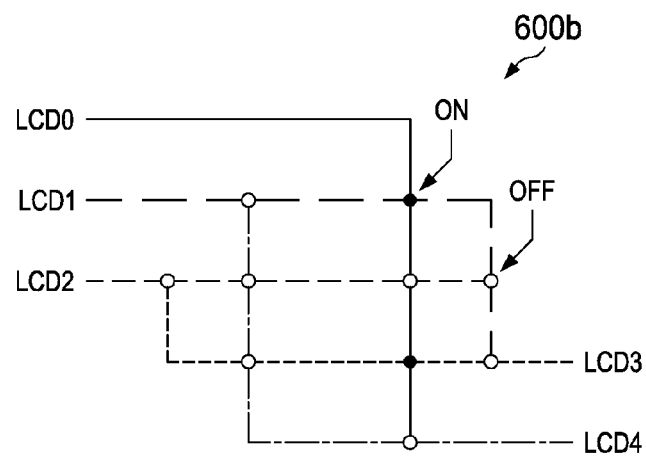
FIG. 6b shows alternate topology 600b for implementing a 5 control line LCD panel in accordance with the principles as discussed herein.

FIGS. 6a and 6b show alternate topologies 600a, b for implementing a 5 control line LCD panel in accordance with the principles as discussed herein. FIG. 6a shows a topology 600a similar to the topology 500 and FIG. 6b shows a topology 600b, which is an alternative implementation. In both topology 600a and 600b, each control line intersects with each other control line. At each intersection lies a controllable segment. Each topology 600a, b shows various segments in an off-state (inactive) and an on-state (active). To activate the desired segments, a waveform generator 404 may transmit a different waveform pattern to each of the five control lines. The waveforms transmitted may cause a voltage difference at the active segments to be above a threshold. Further, the waveforms transmitted may cause a potential difference at the inactive segments to either be less than the threshold or zero. The voltage difference may be the subtraction of the voltages on the two control lines at each segment or associated with each segment. The DC voltage experienced by each segment, however, may be zero to avoid damaging the liquid crystal material. The waveforms applied to the control lines may be time varying with a period proportional to the number of control lines.

Figure 7A:
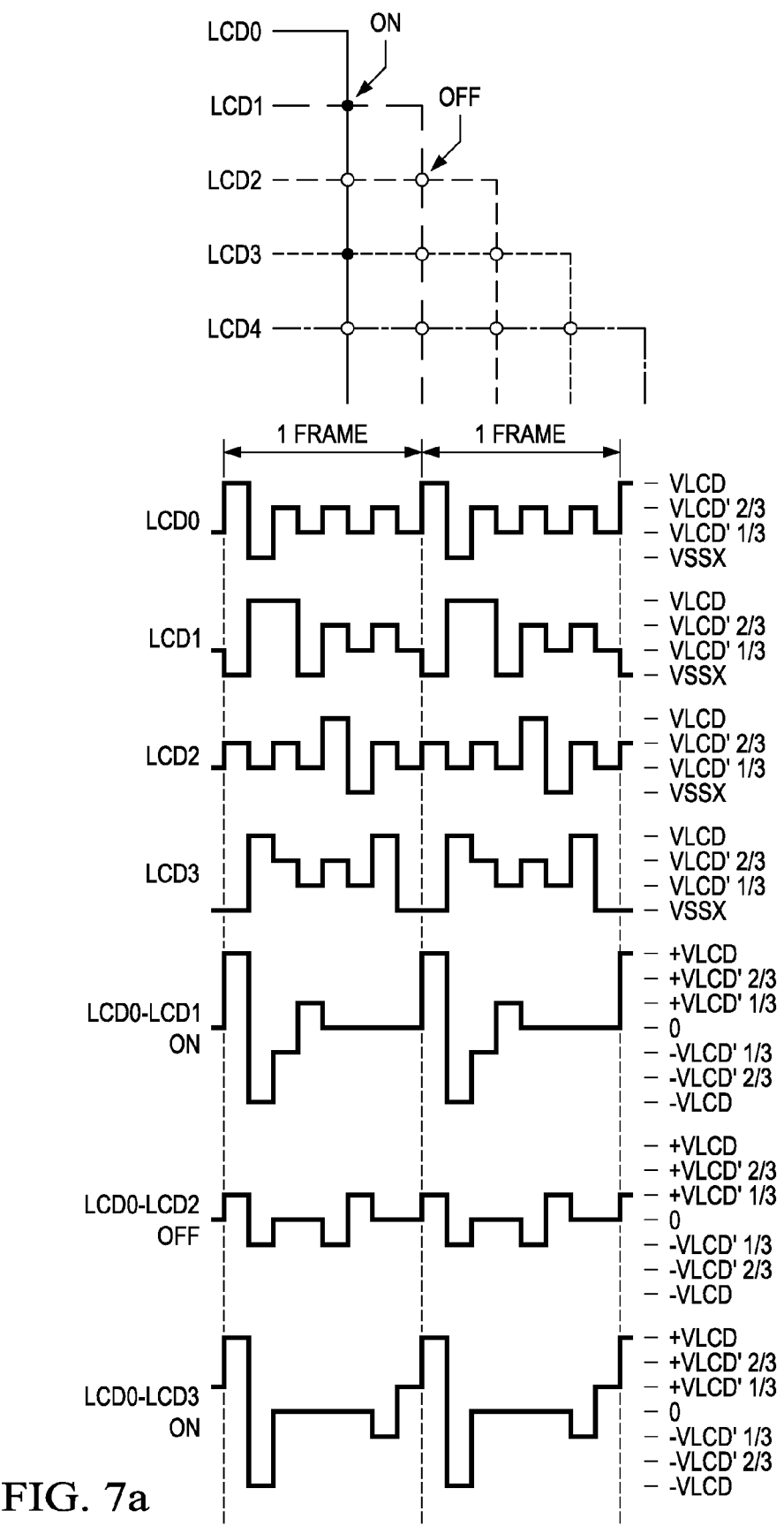
FIG. 7a shows a multiplexed waveform 7a in accordance with the principles discussed herein.
Figure 7B:
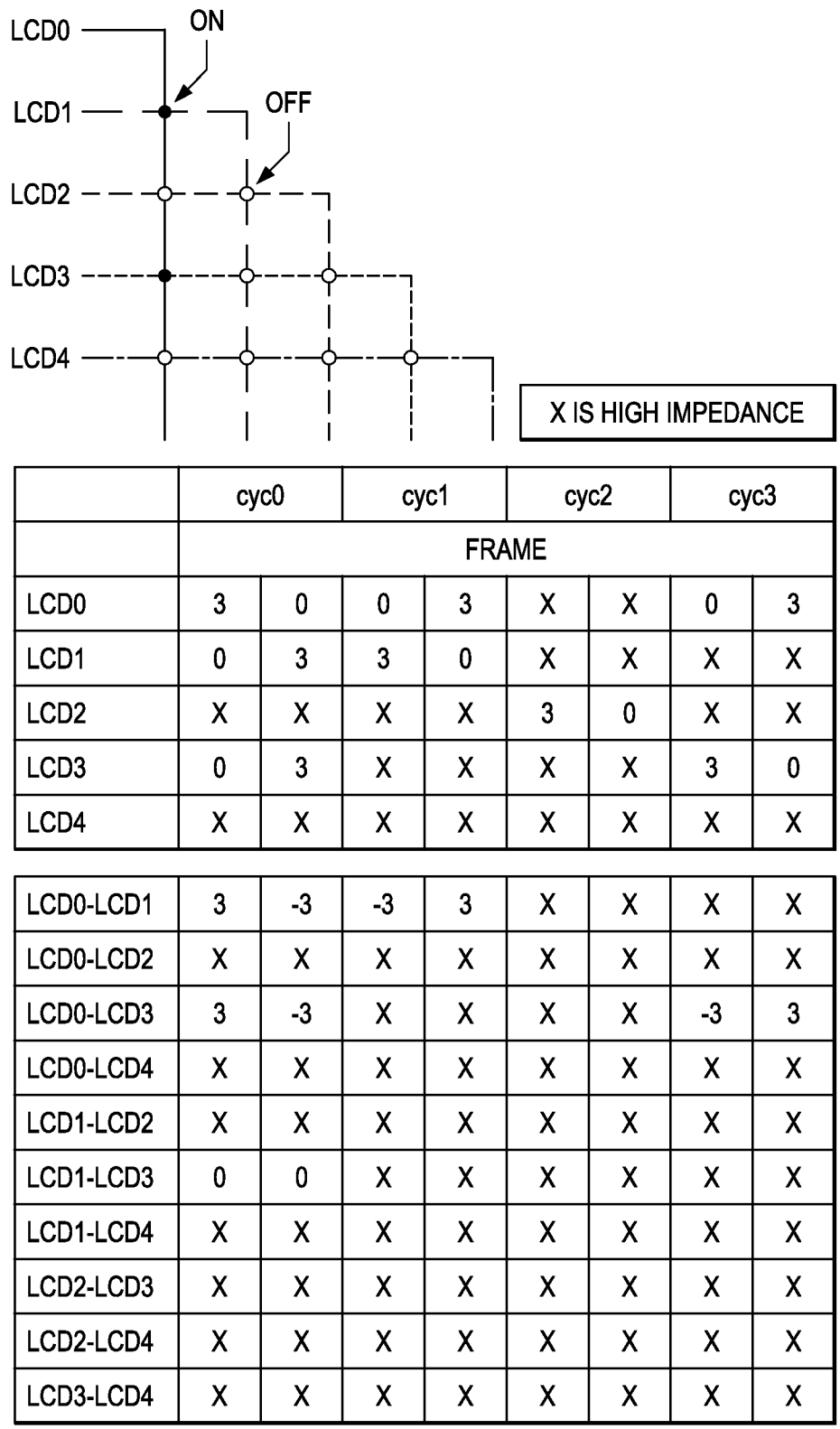
FIG. 7b shows a static waveform 7b in accordance with the principles discussed herein.

FIGS. 7a and 7b show a multiplexed waveform 7a and a static waveform 7b in accordance with the principles discussed herein. Both of the depicted waveforms are for use with a 5 I/O LCD panel implementing the topology 600a as shown. A change in topology may be accompanied with a change in the waveforms used to drive the segments. The multiplexed waveform of FIG. 7a implements three levels of potential between 0V and VLCD, the maximum voltage applied. The number of potential levels used may be a function of the inverse of the number of control lines. The static waveform of FIG. 7b implements two levels of voltage—0V and VLCD, which is represented by 3 in the FIG. 7b. Both waveforms of FIG. 7 are divided into frames with each frame comprising 4 periods or duty cycles. As discussed above, a segment is activated when a potential difference between the two electrodes (control lines) is above a threshold or is at a maximum within the given voltages applied. Voltage difference below the threshold or zero may not activate a segment.

Referring to FIG. 7a, waveforms being applied to the control lines LCD0, LCD1, LCD2 and LCD3 are shown at the top. Two frames of the waveforms are shown and each frame contains four duty cycles. For example, the waveform applied to LCD0 is at VLCD for the first half of the first duty cycle and is at VSSX, which may be 0V, for the second half of the first duty cycle. The waveform applied to LCD0 then varies between ⅓ and ⅔ VLCD for the remaining three duty cycles of the first frame. The three bottom waveforms show the variation in potential difference for the segments at the intersection of LCD0 and LCD1, LCD0 and LCD2 and LCD0 and LCD3. The waveform representing the potential difference for the LCD0-LCD1 intersection shows the potential of LCD1 subtracted from the potential of LCD0.

During the first duty cycle, the LCD-LCD1 waveform goes from +VLCD to −VLCD, which represents the segment in the on-state or activated. During the second duty cycle, the LCD0-LCD1 waveform goes from −⅓ VLCD to +⅓ VLCD, which represents the segment in the off-state or inactive. For the remaining two duty cycles, the LCD0-LCD1 waveform is at 0V, which would be in the off-state. The segment associated with the intersection of the LCD0 and the LCD2 control lines is off the entire frame. Whereas the segment associated with the intersection of the LCD0 and the LCD3 control lines is activated for the first duty cycle. The DC voltage experienced by each segment is 0V.

Referring now to FIG. 7b, the table shows four duty cycles of a single frame and uses a 0 to represent 0V and a 3 to represent the application of 3V. The x's represent the lines being at high impedance. The waveform generator 404 may pull down the control lines to 0V, for example, by coupling the line to ground. A high impedance condition may have the control lines floating with no applied potential or ground. As shown in the bottom section of the table, a segment is activated when the potential difference for a cycle is at +/−3V. A segment is in an off-state when the potential during the duty cycle is at high impedance or is at 0V. Under those guidelines, the segment associated with the LCD0-LCD1 intersection is on during the first two cycles of the represented frame. The segment associated with the LCD0-LCD3 intersection is on during the first and last cycle of the frame.

The implementation of the current disclosure may allow for a reduction in the pin counts for both LCD panels and the associated LCD drivers. A reduction in pin count may directly lead to a decrease in costs in electronics fabrication. Further, the use of a single type of control line may allow for more flexible design for both the segment LCD driver pin mapping and the PCB board layout for the traces. Additionally, the number of controllable segments may greatly increase of conventional LCD panels due to the new control line topology.

The above discussion is meant to be illustrative of the principles and various embodiments of the present invention. Numerous variations and modifications will become apparent to those skilled in the art once the above disclosure is fully appreciated. It is intended that the following claims be interpreted to embrace all such variations and modifications.

What is claimed is:

1. A liquid crystal display (LCD), comprising:
   a plurality of segments; and
   a plurality of control lines to activate the plurality of segments, wherein each of the plurality of segments is associated with an intersection of two of the control lines;
   wherein each of the plurality of control lines intersects with each of the other plurality of control lines only once; and
   wherein a LCD waveform generator to activate the plurality of segments uses a duty cycle inversely proportional the number of control lines of the LCD.

2. The LCD of claim 1, wherein the LCD waveform generator drives a segment in the plurality of segments using more than two drivers.

3. The LCD of claim 1, wherein the LCD waveform generator uses a number of bias levels based on the number of control lines of the LCD.

4. A liquid crystal display (LCD) system, comprising:
   a LCD panel having a plurality of control lines coupled to a plurality of input pins, wherein each control line intersects with each of the other control lines only once and a segment is formed at each intersection, wherein a segment is an area of liquid crystal controlled by voltages applied to the control lines; and
   a LCD waveform generator coupled to the input pins of the LCD panel and configured to generate and transmit waveforms to the plurality of control lines to activate the segments of the LCD panel, wherein a number of output pins of the LCD waveform generator is equal to the number of input pins of the LCD panel;
   wherein the waveforms vary between a plurality of voltage levels proportional to the inverse of the number of control lines.

5. A liquid crystal display (LCD) system, comprising:
   a LCD panel having a plurality of control lines coupled to a plurality of input pins, wherein each control line intersects with each of the other control lines only once and a segment is formed at each intersection, wherein a segment is an area of liquid crystal controlled by voltages applied to the control lines; and
   a LCD waveform generator coupled to the input pins of the LCD panel and configured to generate and transmit waveforms to the plurality of control lines to activate the segments of the LCD panel, wherein a number of output pins of the LCD waveform generator is equal to the number of input pins of the LCD panel;
   wherein the direct current voltage experienced by an activated segment is zero.

* * * * *